(12) United States Patent
Tanaka et al.

(10) Patent No.: US 7,147,731 B2
(45) Date of Patent: Dec. 12, 2006

(54) FLANGED PARTS PRODUCING METHOD, AND HEAT-TREATING DEVICE AND HEAT TREATING METHOD THEREFOR

(75) Inventors: Yoshimasa Tanaka, Hiratsuka (JP); Katsumi Ohmiya, Hiratsuka (JP); Yoshiki Seto, Hiratsuka (JP); Yoichi Mori, Yokohama (JP)

(73) Assignee: Neturen Co., Ltd., Tokyo (JP)

( * ) Notice: Subject to any disclaimer, the term of this patent is extended or adjusted under 35 U.S.C. 154(b) by 232 days.

(21) Appl. No.: 10/471,517

(22) PCT Filed: Mar. 27, 2002

(86) PCT No.: PCT/JP02/02979

§ 371 (c)(1),
(2), (4) Date: Mar. 1, 2004

(87) PCT Pub. No.: WO02/079525

PCT Pub. Date: Oct. 10, 2002

(65) Prior Publication Data

US 2004/0169321 A1    Sep. 2, 2004

(30) Foreign Application Priority Data

Mar. 28, 2001    (JP)    ............... 2001-093465

(51) Int. Cl.
*C21D 1/10*    (2006.01)
(52) U.S. Cl. ...................... 148/574; 148/714
(58) Field of Classification Search .......... 148/574, 148/714

See application file for complete search history.

(56) References Cited

U.S. PATENT DOCUMENTS 1,978,219 A * 10/1934 Otte ........................ 148/108

FOREIGN PATENT DOCUMENTS

| JP | 56-75515 | 6/1981 |
| JP | 9-314234 | 12/1997 |
| JP | 10-17933 | 1/1998 |

(Continued)

OTHER PUBLICATIONS

Masashi Shibata et al., A Method to Induction-Harden Sheet Steel Parts of Automotive Body for Achieving Occupant Safety in Collision, Weight Reduction, and Cost Saving, Jun. 20, 1998, vol. 37, No. 6, pp. 525-527.*

(Continued)

*Primary Examiner*—Roy King
*Assistant Examiner*—Michael P. Alexander
(74) *Attorney, Agent, or Firm*—patenttm.us; James H. Walters

(57) ABSTRACT

A spacer 44 is inserted between an upper end face 44a of a contact column 40, and a lower face of a flange 14. The flange 14 is supported at plural positions by supporting columns 42. In heating a shoulder portion 16 to a hardening temperature, an electroconductive member 56 is placed close to the shoulder portion 16, and an AC current having a frequency which will cause mutual attraction between the current flowing through the elctroconductive member 56 and the current flowing through the shoulder portion 16 is applied to flow through the electroconductive member 56. The shoulder portion 16 having been heated to the hardening temperature is quenched by ejecting a liquid coolant through ejection outlets of a cooling jacket.

20 Claims, 14 Drawing Sheets

FOREIGN PATENT DOCUMENTS

| | | |
|---|---|---|
| JP | 10-156436 | 6/1998 |
| JP | 11-271146 | 10/1999 |
| JP | 2000-79484 | 3/2000 |
| JP | 2000-233224 | 8/2000 |
| JP | 2000-234122 | 8/2000 |
| JP | 2000-256733 | 9/2000 |
| JP | 2000-256733 A | 9/2000 |
| JP | 2001-38421 | 2/2001 |

OTHER PUBLICATIONS

Shinji Shibata et al., SHototsu Anzen.Kelryoka.Tei-costo Doji Tassei suru Hakkoban Body Buhin no Koshuha Yaklire Gijutsu no Kaihatsu,Materia, Jun. 20, 1998, vol. 37, No. 6, p. 525 to 527.

Masashi Shibatat, Masazumi Oonishi, Kouji Makino and Shinji Kurach, Method of Improving Side Impact Protection Performance by Induction Hardening of Body Reinforcement, Feb. 23-26, 1998, pp. 105-117, Advances in Safety Technology (SP-1321), 980550.

* cited by examiner (a)

(b)

(a)

(b)

(a)

(b)

(c)

(a)

(b)

FLANGED PARTS PRODUCING METHOD, AND HEAT-TREATING DEVICE AND HEAT TREATING METHOD THEREFOR

TECHNICAL FIELD

The present invention relates to a method for producing a flanged article having a flange stretching out of the periphery, and a heat-treating device and a heat-treating method for producing the flanged article.

BACKGROUND TECHNIQUE

Conventionally, flanged articles having a flange stretching out of its periphery are used in various industrial application fields. An example of the flanged articles is a center pillar reinforce of a car. This center pillar reinforce serves to protect the persons in the car on collision from a lateral side by reducing the collision force (impact force). For the reduction of the collision impact, the center pillar reinforce is sometimes partly quench-hardened, not entirely, for dispersing the collision impact.

The center pillar reinforces are produced by press-forming. Various techniques have been disclosed for the hardening of the worked parts like the press-formed articles (e.g., JP-A-54-78311, JP-A-4-72010, JP-A-6-330165, and JP-A-10-17933 ("JP-A" herein means Japanese Patent Application Laid-Open Publication)).

Of these Patent Application Laid-Open Publications, JP-A-54-78311 discloses a technique of irradiation of a working object with a laser beam to harden locally the irradiated portion. This technique is shown to be capable of hardening only a limited portion of the working object.

JP-A-4-72010 discloses a technique of irradiation of a press-formed product with high-density energy like a laser beam at the strength-requiring portion only to harden the irradiated portion. This technique is shown, like the above technique, to be capable of hardening only a limited portion of the working object.

JP-A-6-330165 discloses a technique of hardening a flat plate and press-molding this hardened plate. With this technique, the deformation caused by the hardening is corrected by press-forming.

JP-A-10-17933 discloses a technique of hardening to cause local change of the hardness in the press-formed product. This technique is shown to give mountain-shaped hardness distribution to improve impact energy absorbency.

Of the above four JP-A disclosures, the three except JP-A-330165 consider little the possible deformation caused after the quench-hardening. Therefore, these techniques can cause significant deformation of a press-formed product of a thin plate.

With the technique disclosed in JP-A-330165, the degree of bending of the plate is limited since the flat plate is press-formed after hardening.

On the other hand, a technique is disclosed (Materia Japan, Vol. 37, No. 6 (1998)) by which a flanged article like a center pillar reinforce is hardened with the flange forcibly deformed elastically by fixing (clamping) by a clamping device. By this technique, firstly the flanged article is hardened with the flange clamped. After the hardening, springback displacement of the unclamped article is recorded. The height of the support for the flanged article is adjusted to cause the same extent of displacement in the reverse direction to cause elastic deformation of the flange, and in this deformed state, hardening is conducted. After the hardening, the unclamped flanged article does not have deformation. Such a technique is described in the above report.

In the above technique of deforming the flange elastically, however, the flange is clamped at constant intervals. The flange may have less rigid portion depending on its shape, so that the flange can be broken at this less rigid portion. In particular, an article obtained by press-forming of a thin plate is liable to be broken.

DISCLOSURE OF THE INVENTION

Under the aforementioned circumstances, the present invention intends to provide a method for producing a flanged article without breaking with less deformation even from a thin plate by press-forming, and a heat-treating device and heat-treating method for producing the flanged article.

For achieving the above object, the method of the present invention for producing a flanged article having a flange stretching out of the periphery comprises steps of (1) forming the flanged article by press-forming a prescribed source material, (2) deforming elastically only a predetermined first portion of the flange of the flanged article by application of an external force in a predetermined direction, (3) hardening a predetermined second portion of the flanged article other than the flange with the first portion being kept deformed elastically, and (4) releasing the external force after the hardening step to produce the flanged article.

The external force may be applied to the first portion by (5) bringing a predetermined contact member downward into contact with the upper face of the first portion, or upward into contact with the lower face of the first portion, and (6) inserting a spacer between the face in contact with the contact member and the contact member corresponding to the predetermined external force in the predetermined direction to apply the external force to the first portion.

The first portion and the predetermined direction may be decided preliminarily by (7) hardening the flanged article formed by press-forming of a prescribed source material at the second portion thereof locally without application of an external force, (8) measuring, after the hardening, extents and directions of resulting deformation at plural positions of the flange, and (9) deciding, as the first portion, the portion where the deformation exceeds a predetermined extent, and deciding, as the predetermined direction, the direction reverse to the deformation direction.

In deforming elastically the predetermined portion of the flange,

(10) the portion of the flange other than the first portion may be supported upward by a supporting member to keep the original shape before the hardening of the flanged article.

In supporting the portion of the flange other than the first portion,

(11) the portion may be supported from the lower side by supporting members to have the supporting members to be movable to follow the movement of the portion other than the first portion.

Further, in supporting the portion of the flange other than the first portion from the lower side,

(12) a stopper is provided above supporting position with a predetermined clearance to stop upward movement of the supported portion.

The aforementioned second portion may be hardened by

(13) bringing an electrode into contact with the second portion at or near one end and another electrode at or near the opposite end, and bringing an electroconductive member close to the second portion to apply an electric current to the second portion, and

(14) applying, to the electroconductive member, an AC current having a frequency which causes mutual attraction between the current flowing through the electroconductive member and the current flowing through the second portion to heat the second portion up to the hardening temperature.

In bringing the electrodes into contact with the one end and the opposite end respectively,

(15) the electrodes may be brought into contact to be movable to follow the movement of the one end and the other end or vicinity thereof.

In bringing the electroconductive member close to the second portion,

(16) the electroconductive member and the second portion are brought into contact with interposition of an insulating member to keep invariable the clearance between the electroconductive member and the second portion.

The second portion having been heated to the hardening temperature may be quenched by

(17) ejecting a liquid coolant onto the face of the second portion from the side reverse to the electrode-contacting face through ejection outlets placed at uniform distances from the reverse face.

In forming a flanged article by press-forming of a prescribed source material,

(18) the flanged article may be an article which extends in a prescribing direction and has a cross-section in a shape of a hat having a brim.

In formation of the flanged article by press-forming of a prescribed source material,

(19) a center pillar reinforce of a car may be formed as the flanged article.

The heat-treating apparatus for achieving the object of the present invention for heat-treating a flanged article having a flange stretching out of a periphery comprises:

(20) a contact member for contact with only a predetermined first portion of the flange of the flanged article from an upper side or a lower side,

(21) a spacer having a predetermined thickness to be inserted between the contact member and the first portion to be in contact with this contact member, and

(22) a supporting member for supporting the portion of the flange other than the first portion to follow the shape of the flange.

(23) The supporting member may be made movable to follow the movement of the portion of the flange other than the first portion.

The heat-treating apparatus may comprise

(24) electrodes respectively brought into contact with the flange of the flanged article at or near one end and at or near the other end of the flange of the flanged article, and

(25) an electroconductive member for allowing electric current to flow through the second portion.

The heat-treating apparatus may comprise

(26) a clearance-retaining member fixed to the electroconductive member for retaining the clearance between the electroconductive member and the second portion.

The heat-treating apparatus may comprise

(27) a cooling jacket placed at a nearly uniform spacing from the face of the second portion reverse to the electrode-contacting face and having ejection outlets for ejecting a liquid coolant.

For achieving the objects of the present invention, the heat-treating method for heat-treating a flanged article having a flange stretching out of the periphery comprises:

(28) deforming elastically only a predetermined first portion of the flange of the flanged article by application of an external force in a predetermined direction, and

(29) hardening a predetermined second portion of the flanged article other than the flange portion thereof with the first portion being kept deformed elastically.

The external force may be applied to the first portion by

(30) bringing a predetermined contact member downward into contact with the upper face of the first portion, or upward into contact with the lower face of the first portion, and

(31) inserting a spacer between the face of the first portion in contact with the contact member and the contact member corresponding to the predetermined external force in the predetermined direction to apply the external force to the first portion.

The first portion and the predetermined direction may be decided preliminarily by

(32) hardening the flanged article locally at the second portion without application of an external force,

(33) measuring, after hardening, extents and directions of resulting deformation at plural positions of the flange, and

(34) deciding, as the first portion, the portion where the deformation exceeds a predetermined extent, and deciding, as the predetermined direction, the direction reverse to the deformation direction.

In deforming elastically the predetermined portion of the flange,

(35) the portion of the flange other than the first portion may be supported upward by a supporting member to keep the original shape before the hardening of the flanged article.

In supporting the portion of the flange other than the first portion,

(36) the portion may be supported from the lower side by supporting members to have the supporting members to be movable to follow the movement of the portion other than the first portion.

Further, in supporting the portion of the flange other than the first portion from the lower side,

(37) a stopper is provided above supporting position with a predetermined clearance to stop upward movement of the supported portion.

The second portion may be hardened by

(38) bringing an electrode into contact with the second portion at or near one end and another electrode at or near the opposite end, and bringing an electroconductive member close to the second portion to apply an electric current to the second portion, and

(39) applying, to the electroconductive member, an AC current having a frequency which causes mutual attraction between the current flowing through the electroconductive member and the current flowing through the second portion to heat the second portion up to the hardening temperature.

In bringing the electrodes into contact with the one end and the opposite end respectively,

(40) the electrodes may be brought into contact to be movable to follow the movement of the one end and the other end or vicinity thereof.

In bringing the electroconductive member close to the second portion,

(41) the electroconductive member and the second portion are brought into contact with interposition of an insulating member to keep invariable the clearance between the electroconductive member and the second portion.

The second portion having been heated to the hardening temperature may be quenched by

(42) ejecting a liquid coolant onto the face of the second portion from the side reverse to the electrode-contacting face through ejection outlets placed at uniform distances from the reverse face.

BEST MODE FOR CARRYING OUT THE INVENTION

The mode for carrying out the invention is explained by reference to the drawings.

A center pillar reinforce which is an example of the flanged article of the present invention is explained by reference to FIGS. 1–5.

Figure 1:
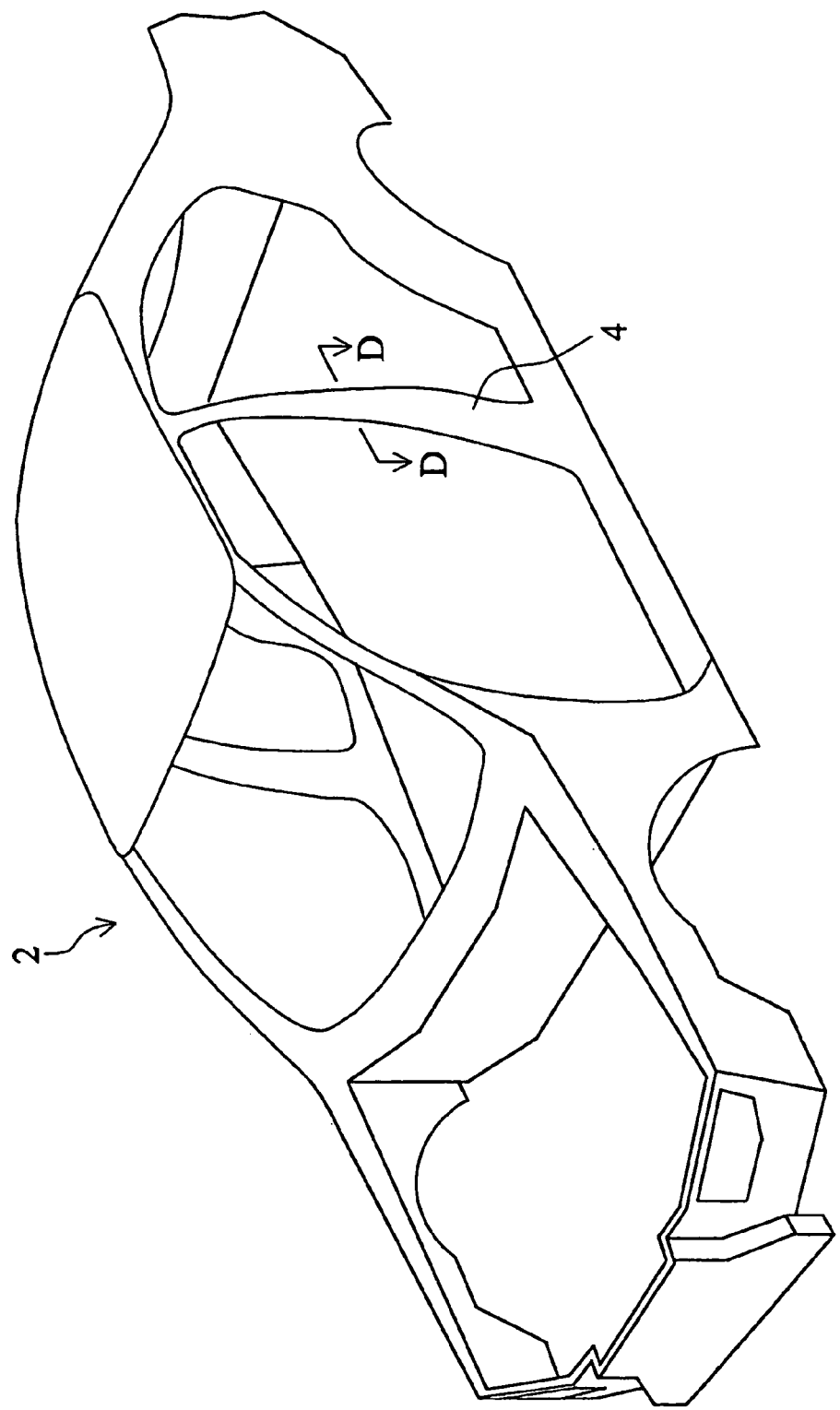
FIG. 1 is a perspective view illustrating schematically a construction of a car having a center pillar reinforce.
Figure 2:
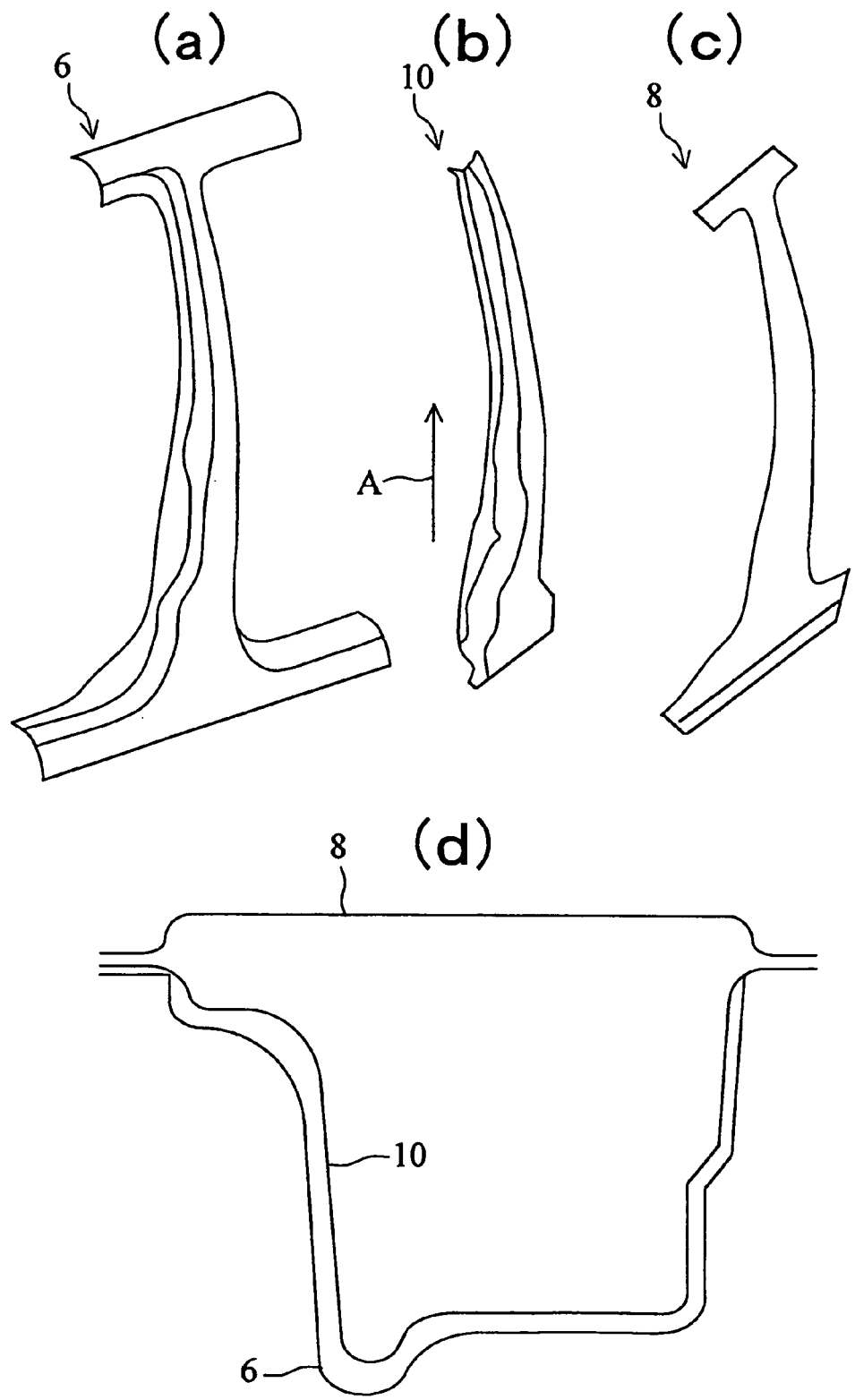
FIGS. 2(a)–2(d) are drawings of parts constituting the center pillar of a car shown in FIG. 1: (a) a perspective view illustrating schematically constitution of a center pillar outer, (b) a perspective view illustrating schematically constitution of a center pillar reinforce, (c) a perspective view illustrating schematically constitution of a center pillar inner, and (d) a sectional view along line D—D in FIG. 1.
Figure 3:
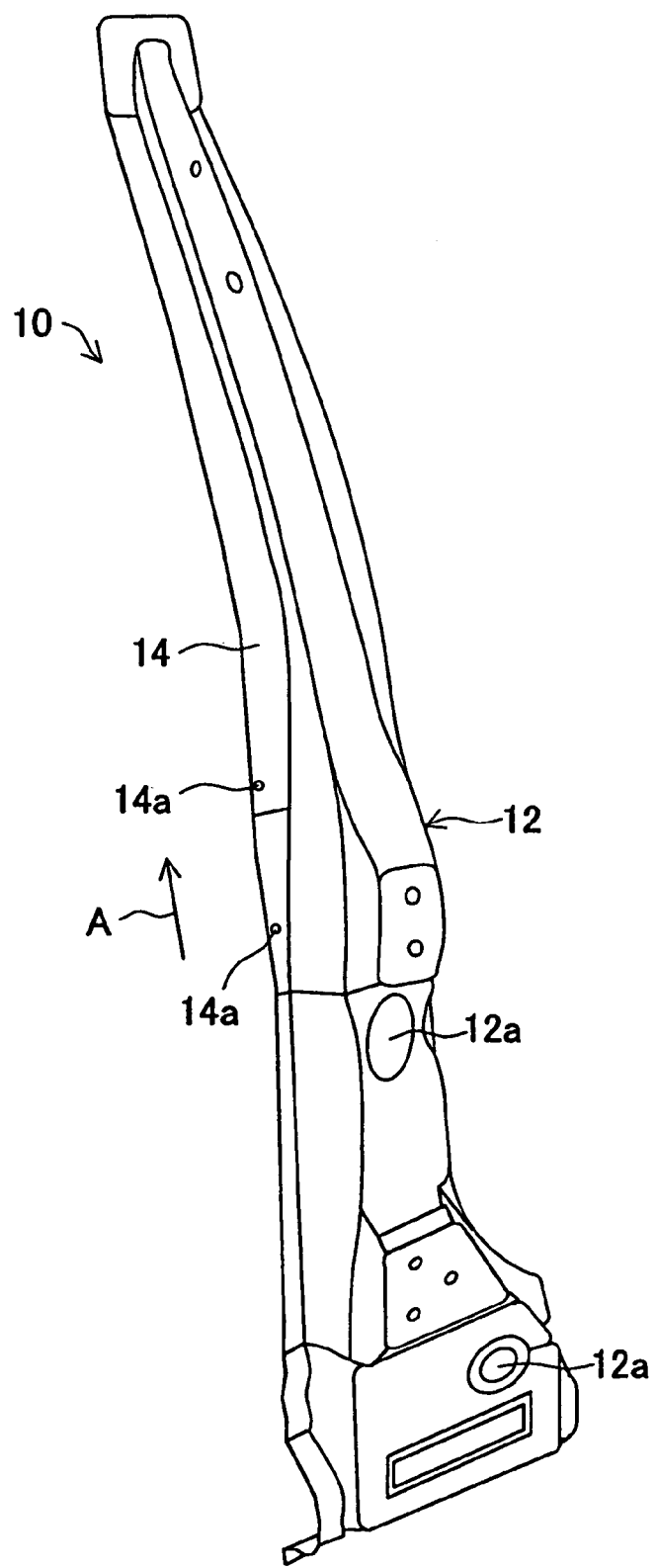
FIG. 3 is a perspective view of an example of the center pillar reinforce.
Figure 4:
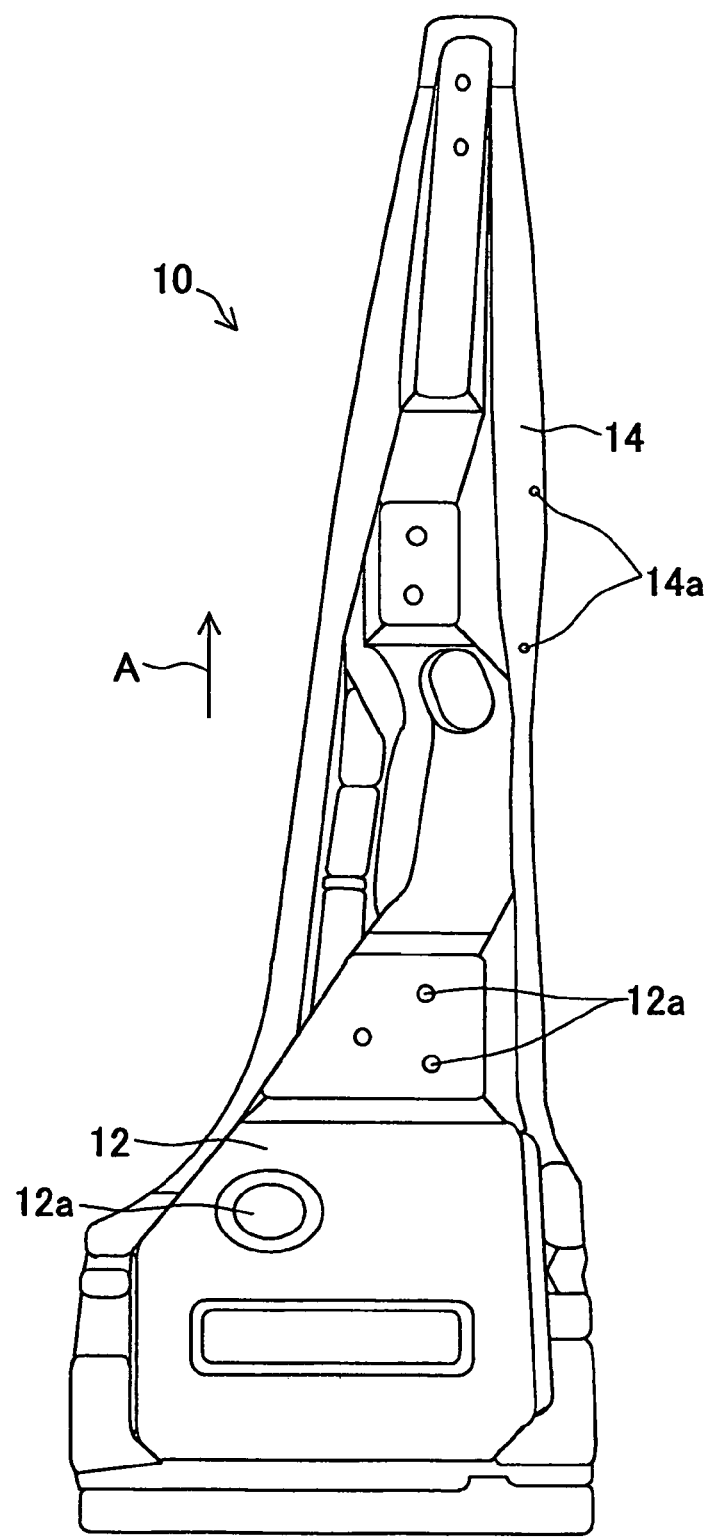
FIG. 4 is a plan view of the center pillar reinforce shown in FIG. 1.
Figure 5:
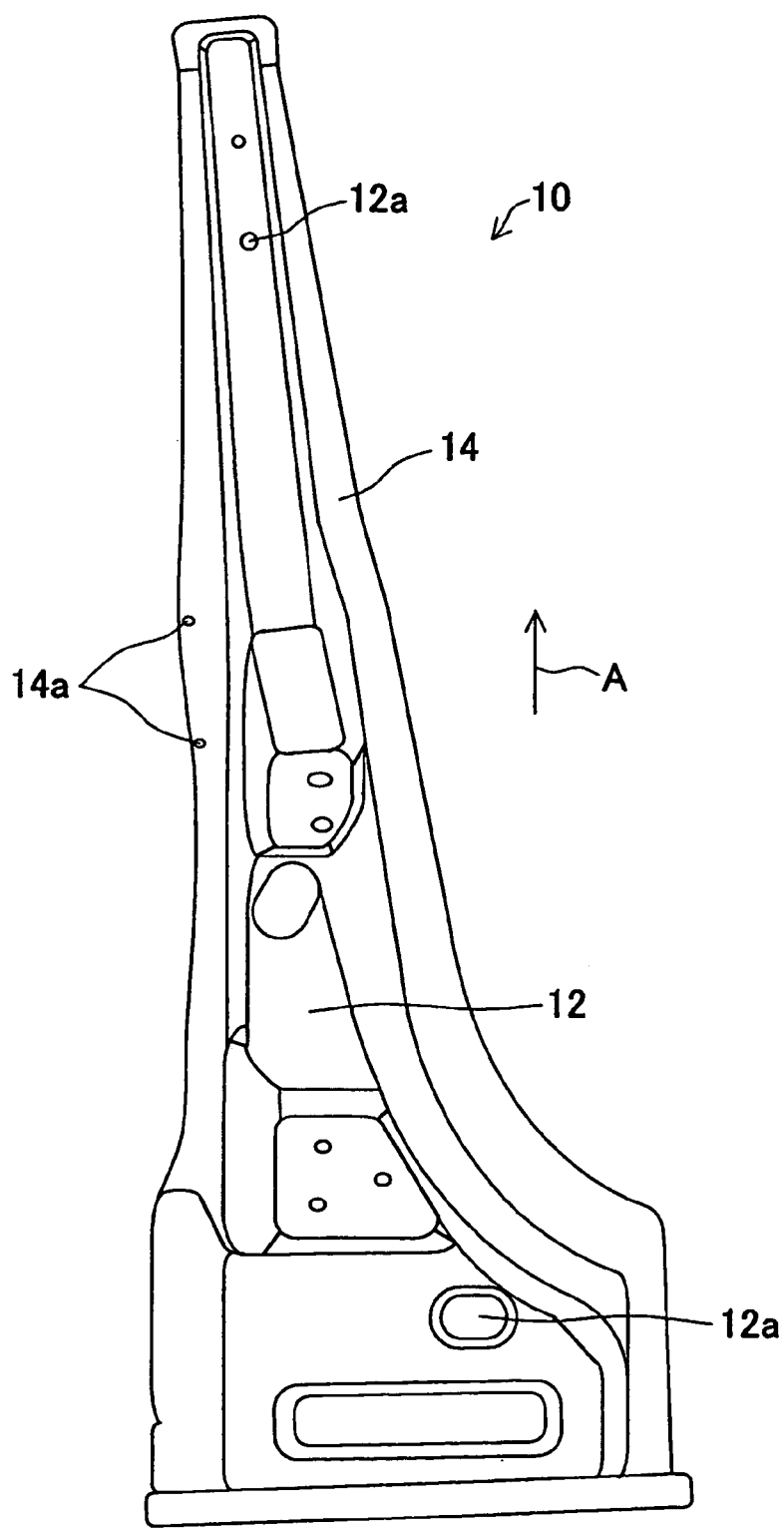
FIG. 5 is a rear view of the center pillar reinforce shown in FIG. 1.

FIG. 1 is a perspective view illustrating schematically a construction of a car having a center pillar reinforce. FIGS. 2(a)–2(d) are drawings of the parts constituting the center pillar of a car shown in FIG. 1: (a) a perspective view illustrating schematically constitution of a center pillar outer, (b) a perspective view illustrating schematically constitution of a center pillar reinforce, (c) a perspective view illustrating schematically constitution of a center pillar inner, and (d) a sectional view along line D—D in FIG. 1. FIG. 3 is a perspective view of an example of the center pillar reinforce. FIG. 4 is a plan view of the center pillar reinforce shown in FIG. 3. FIG. 5 is a rear view of the center pillar reinforce shown in FIG. 3.

As shown in FIG. 1, a center pillar 4 of a car 2 is constituted of a center pillar outer 6 corresponding to the outside wall of the center pillar 4, a center pillar inner 8 corresponding to the inside wall of the center pillar 4, and a center pillar reinforce 10 held between them.

The center pillar reinforce (hereinafter referred to as a "work") 10 is formed from a thin flat plate (about 1.6 mm thick) by press-forming. The work 10 is finished through a hardening process as mentioned later. The material of the thin plate is SPCC containing 0.1–0.2% C.

The work 10 is a long article extending in the arrow-A direction, and is curved as a whole in an arch shape with the back side directed inside. The work 10 is constituted, as shown in FIG. 3, of a protruding portion 12 having the top face becoming narrower gradually along the arrow-A direction, and a flange 14 stretching out of the periphery of the protruding portion 12. The protruding portion 12 has holes 12a in various shapes. The flange 14 has also has holes 14a. The cross section of the work 10 is in a shape of a hat having a brim as shown in FIG. 5 explained later. Such a thin slender part is liable to be deformed by quench-hardening, and is liable to be broken at a portion having low sectional rigidity. As well-known, the work 10 is set to the car with the side of the upstream side of the arrow-A (the narrower portion) placed upward.

A hardening apparatus (an example of heat-treating apparatus of the present invention) and a hardening method (an example of heat-treating method of the present invention) are explained below which are effective for hardening the readily deformable and readily breakable article without causing deformation and breaking. Incidentally, only a limited portion of the protruding portion 12 of the work 10 is hardened as mentioned later.

Figure 7:
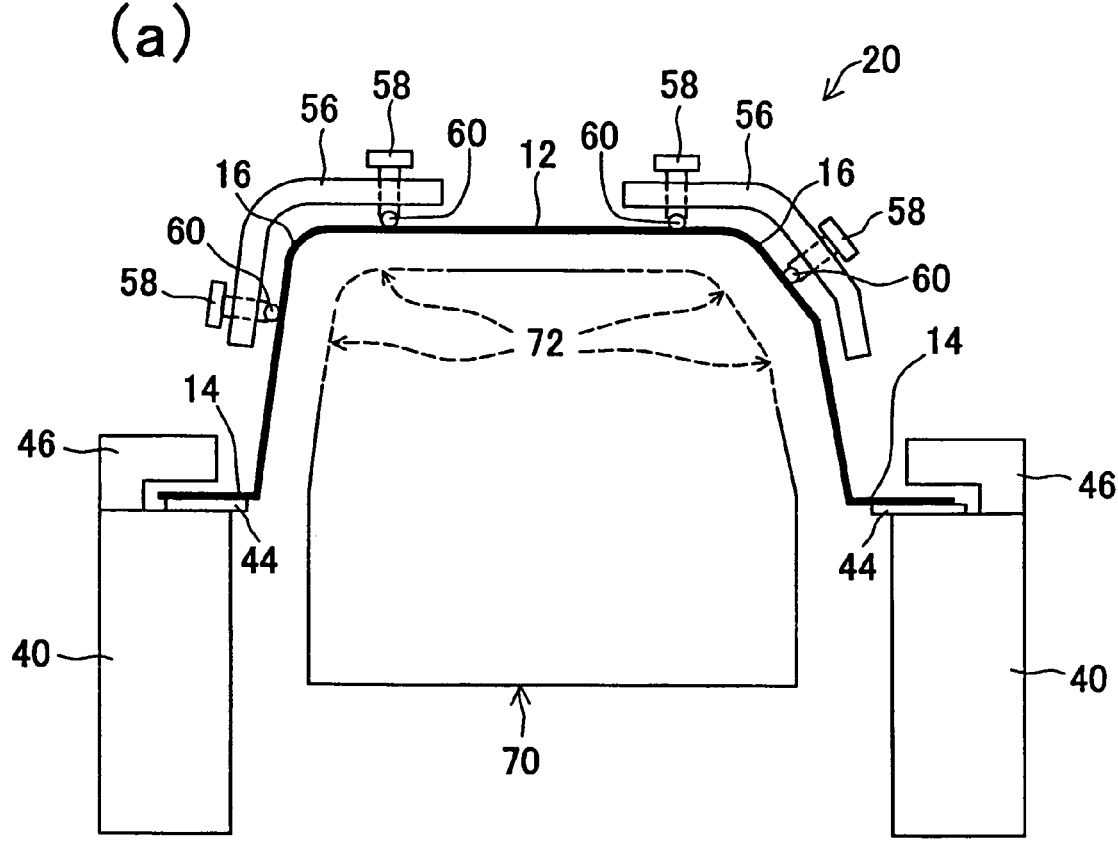
FIG. 7(a) is a front view of the hardening apparatus shown in FIG. 4.
FIG. 7(b) is a front view of a bolt and a ceramic ball.
Figure 7:
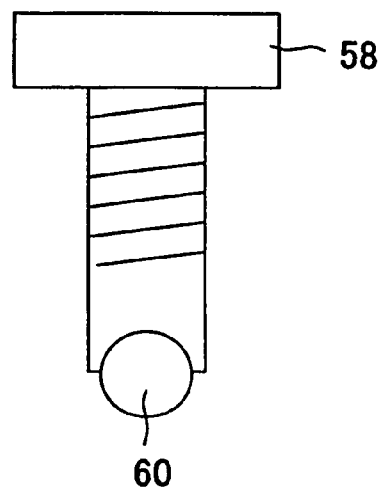
Figure 8:
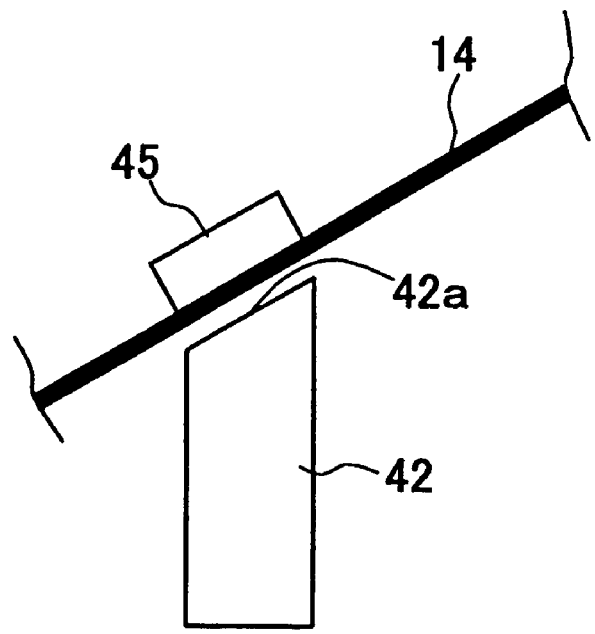
FIG. 8(a) is a schematic side view showing a state of contact of the work with a stopper during the hardening operation.
FIG. 8(b) is a schematic view of the work deformed elastically by a spacer (shim).
Figure 8:
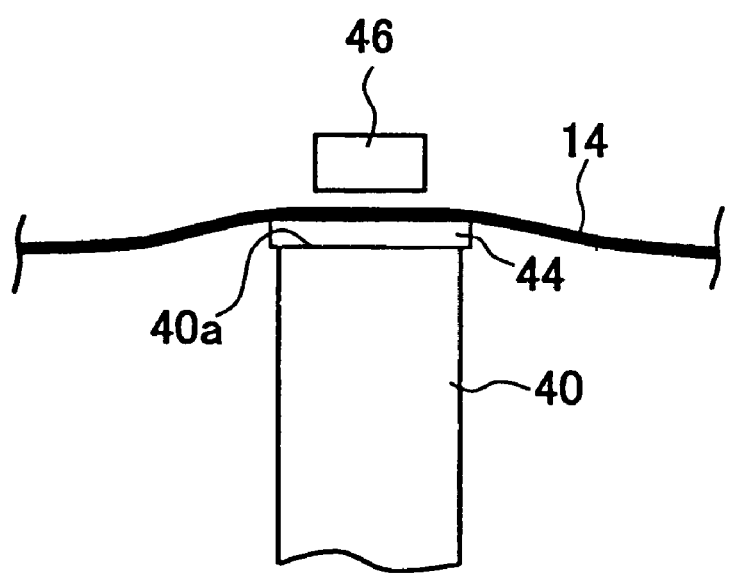

The hardening apparatus is explained by reference to FIGS. 6, 7, and 8.

Figure 6:
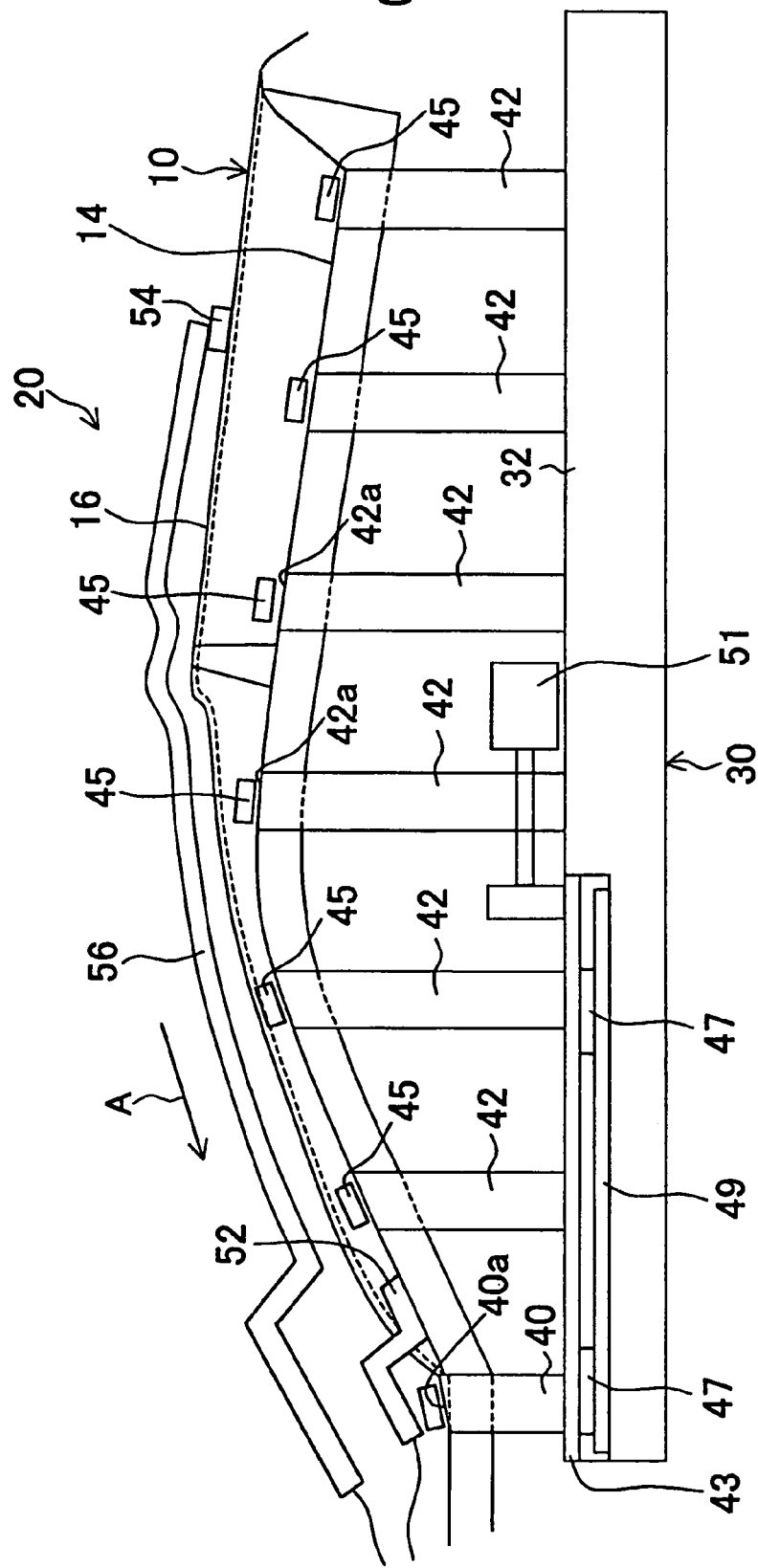
FIG. 6 is a side view of a hardening apparatus in which a work is set.

FIG. 6 is a side view of a hardening apparatus in which a work is set. FIG. 7(a) is a front view of the hardening apparatus shown in FIG. 6, and FIG. 7(b) is a front view of a bolt and a ceramic ball. FIG. 8(a) is a schematic side view showing a state of contact of the work with a stopper during the hardening operation, and FIG. 8(b) is a schematic view of the work deformed elastically by a spacer (shim).

The hardening apparatus has a pedestal 30 as the base, and plural columns 40, 42 rising from the upper face 32 of the pedestal 30. The heights of the columns 40,42 are adjusted to support the flange 14 from the lower side in accordance with the shape of the flange 14. When the flange 14 is placed along the top end faces 40a,42a of the columns 40,42, the lower face of the flange 14 comes into contact with the top end faces 40a,42a. The column 40 is an example of a contact member of the present invention, and is hereinafter referred to as a contacting column 40. The column 42 is an example of the supporting member of the present invention, and is hereinafter referred to as a supporting column 42.

The top end face 40a of the contacting column 40 is not in direct contact with the lower face of the flange 14, but is brought into contact with the lower face of the flange 14 with interposition of a spacer 44 having a prescribed thickness as shown in FIG. 8(b). That is, the spacer 44 is inserted between the top end face 40a of the contacting column 40 and the lower face of the flange 14. This spacer 44 deforms elastically the flange 14 locally upward at the portion contacting through the spacer 44 with the top end face 40a of the contact column 40 (this portion being an example of the prescribed "first portion" of the present invention). This contacting portion is fixed by a clamp 46.

In the example of FIG. 6, the contacting column 40 is brought into contact with the flange 14 from the lower side to deform elastically the contact portion upward. Otherwise, the contact column 40 may be brought into contact from the upper side with the flange 14 to deform the contacting portion elastically downward. The extent of the elastic deformation, the thickness of the spacer 44, and so forth are described later.

Above the supporting column 42, stoppers 45 are placed respectively apart from the top end face 42a with a clearance of several times a thickness of flange 14. The stoppers 45 prevent the movement of the portion of the flange 14 supported by the supporting column 42 beyond the positions of the stoppers 45 during the hardening.

The lower ends of the respective supporting columns 42 are not fixed to the pedestal 30, but are designed to be movable freely in the length direction (arrow-A direction) or the breadth direction (arrow-B direction) of the work 10 along a guide rail or the like (not shown in the drawing). Therefore, the supporting columns 42 are movable (displaceable) with the flange 42 even if the flange 14 moves (displaces) by the heating-cooling for local hardening of the work 10. Thus, the supporting columns 42 do not restrain the flange 14.

In this example, a limited section of the protruding portion 12 of the work 10 is hardened. This section is a shoulder portion 16 (an example of the "second portion" in the present invention) corresponding to the shoulder of the protruding portion 12 as shown in FIG. 7. There are two shoulder portions 16, extending in the length direction (arrow-A direction) of the work 10.

Figure 9:
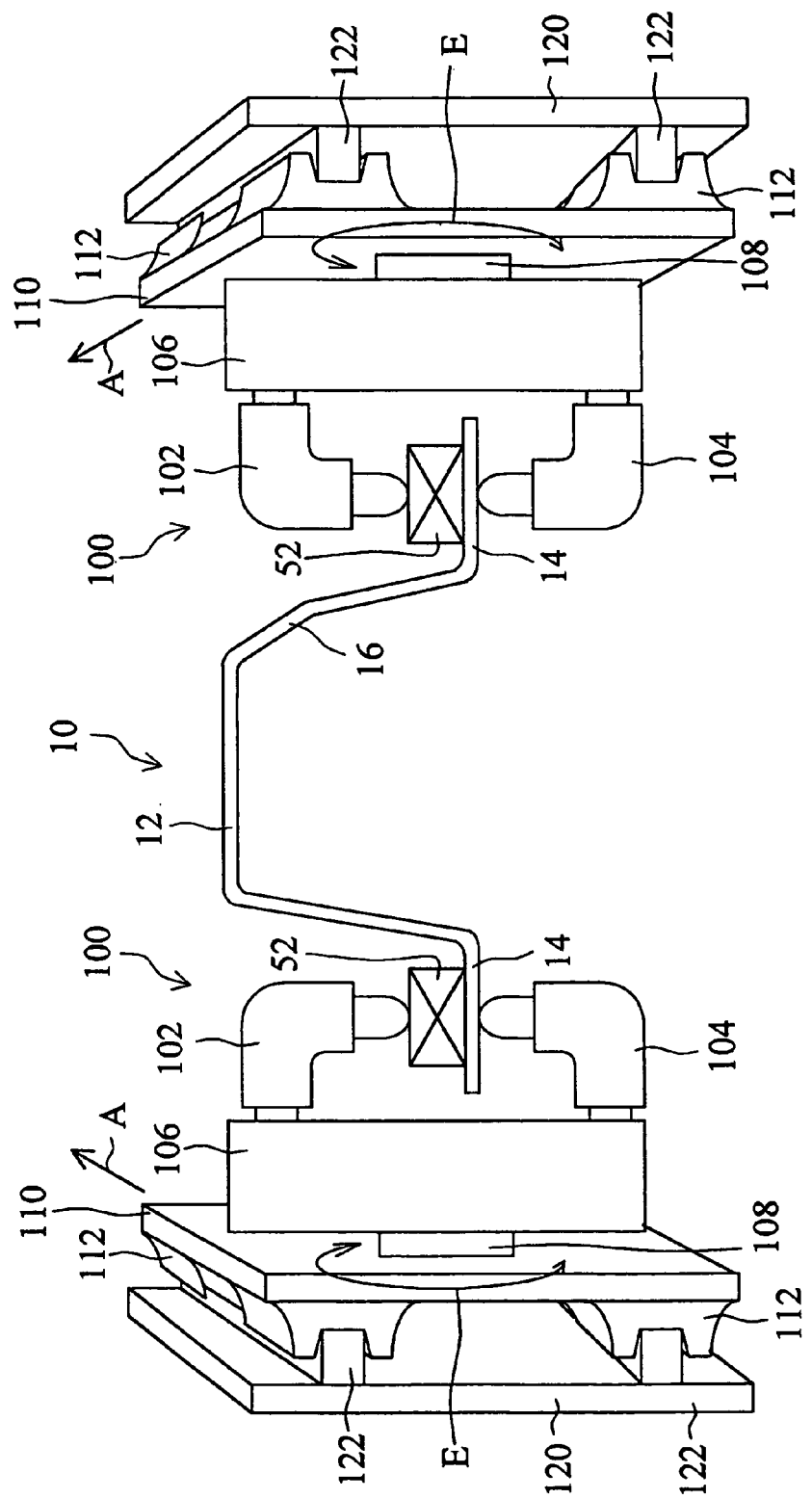
FIG. 9 is a perspective view of an electrode and a driving device for moving the electrode with movement of a flange.

The hardening apparatus 20 has an electrode 54 to be brought into contact with an end portion of the shoulder portions 16 in the length direction, and a second electrode 52 to be brought into contact with the upper face (an example of vicinity of the other portion in the present invention) of the flange 14 at the side opposite to the above-mentioned end portion. These two electrodes 52,54 will move to follow the movement (displacement) of the flange 14 or the shoulder portion 16 caused by heating-cooling, as shown in FIG. 9 described later. Therefore the electrodes 52,54 do not restrain the flange 14 or the shoulder portion 16.

The hardening apparatus 20 has an electroconductive member 56 for applying the electric current to the shoulder portion 16. The electroconductive member 56 is placed near the shoulder portion 16 and is a long member extending in the length direction. The cross section of the electroconductive member 56 is in an arch shape as shown in FIG. 7(a).

At plural positions of the electroconductive member 56, bolt holes are bored. A bolt 58 is screwed into the respective bolt holes. The bolt 58 has a ceramic ball 60 (an example of an insulating member of the present invention) adhered at the tip thereof. This ceramic ball 60 is brought into contact with the shoulder portion 16. Therefore, the bolt 58 is not brought into direct contact with the shoulder portion 16. In the absence of the bolts 58 and balls 60, the electroconductive member 56 can come to be in direct contact with the shoulder portion 56 owing to the self weight. However, the bolts and the balls 60 keep constant the clearance between the electroconductive member 56 and the shoulder portion 16.

Therefore, even if the shoulder portion 16 is deformed by the heating, the clearance between the electroconductive member 56 and the shoulder portion 16 is kept constant by the bolts 58 and the balls 60 without approaching or departure of a part thereof to or from the electroconductive member 56, so that the shoulder portion can be heated entirely uniformly up to the hardening temperature. The bolts 58 and the ceramic balls 60 constitute the clearance-retaining member of the present invention.

Above the face (back face) of the work 10 reverse to the face in contact with the electrodes 52,54, a cooling jacket 70 is provided for ejecting a liquid coolant. The cooling jacket 70 has plural ejection outlets 72 for ejecting the liquid coolant. The ejection outlets 72 are arranged at nearly uniform distances from the back face of the work 10.

A moving device for moving the electrode 52 to follow the movement of the flange 14 is explained below by reference to FIG. 9.

FIG. 9 is a perspective view of the electrodes and moving device for holding the electrode to be movable to follow the movement of the flange. In FIG. 9, the same symbols are used for indicating the corresponding constituting elements as those shown in FIG. 7.

The moving device 100 comprises an upper pushing member 102 for pushing the electrode 52 downward and a lower pushing member 104 for pushing the lower face of the flange. 14 upward. The upper pushing member 102 and the lower pushing member 104 are connected to an air chuck 106 to be capable of changing their positions in correspondence with the thickness of the electrode 52 and the thickness of the flange 14.

The air chuck 106 is fixed through a ball bearing 108 to a movable plate 110 to be turnable in the arrow-E directions. On the face of the movable plate 110 reverse to the face connected to the ball bearing (back face), a pair of linear motion ball bearings 112 are attached. Into the linear motion ball bearings 112, guide rails 122 formed on the base wall 120 of the hardening apparatus 20 (see FIG. 6, etc.) are fit. The guide rail 122 extends in the length direction of the flange 14 (length direction of the work 10, namely the arrow-A direction and the reverse direction). Therefore, the movable plate 110 is movable in the arrow-A direction and the reverse direction.

The electrode 52 is pushed against the flange 14 by the moving device 100 of the above constitution. Therefore, the electrode 52 can move in correspondence with the movement (displacement) of flange 14 in heating-cooling of the work 10 to protect the work 10 from excessive stress not to be broken. The electrode 54 may be held by a similar moving device.

Figure 10:
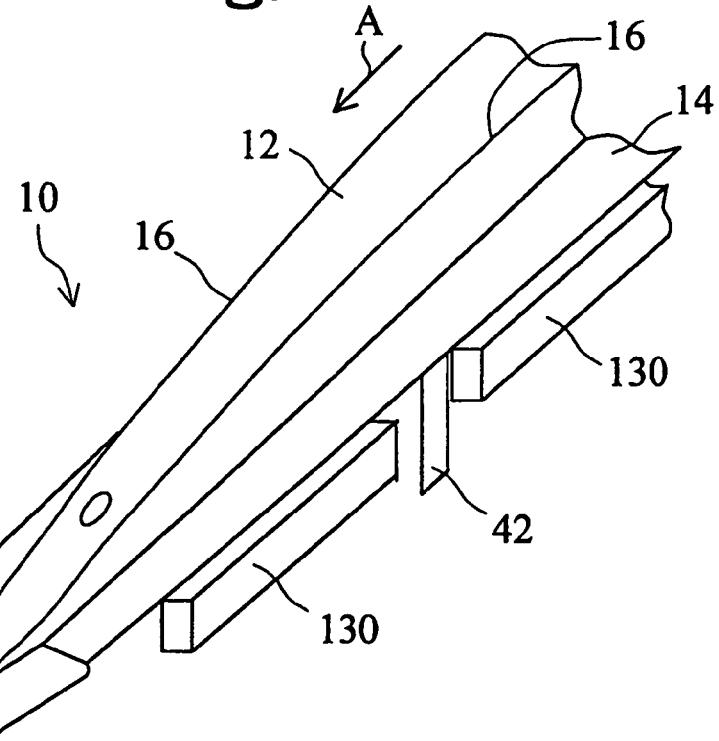
FIG. 10(a) is a perspective view of an auxiliary cooler jacket for cooling the flange from the lower side.
FIG. 10(b) is a front view of the jacket of FIG. 10(a)
FIG. 10(c) is a front view of a work of another shape and an auxiliary cooling jacket for this work.
Figure 10:
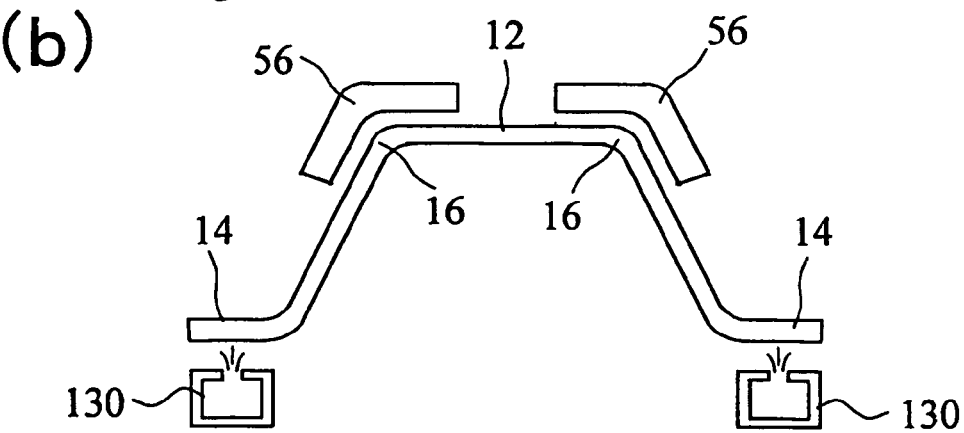
Figure 10:
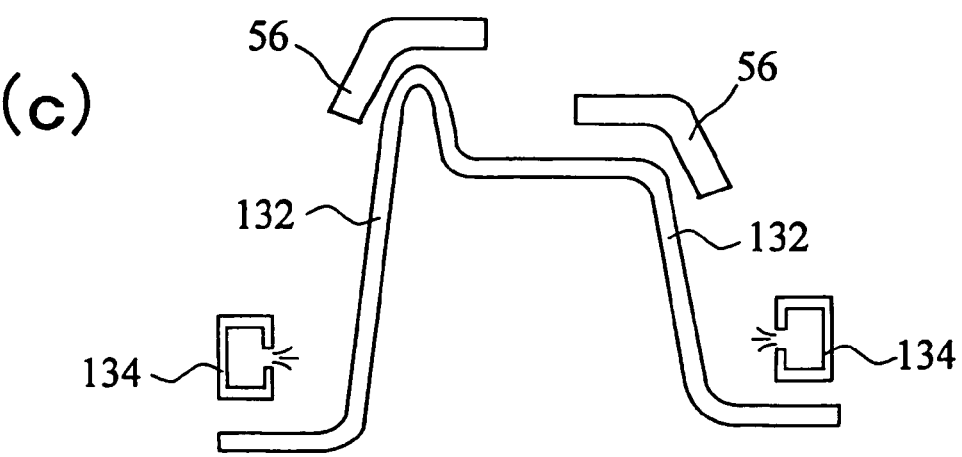

The aforementioned hardening apparatus may be provided with an additional device other than the ones mentioned above to prevent more surely break and deformation of the work 10. Such additional devices are explained by reference to FIGS. 10, 11, and 12.

Figure 11:
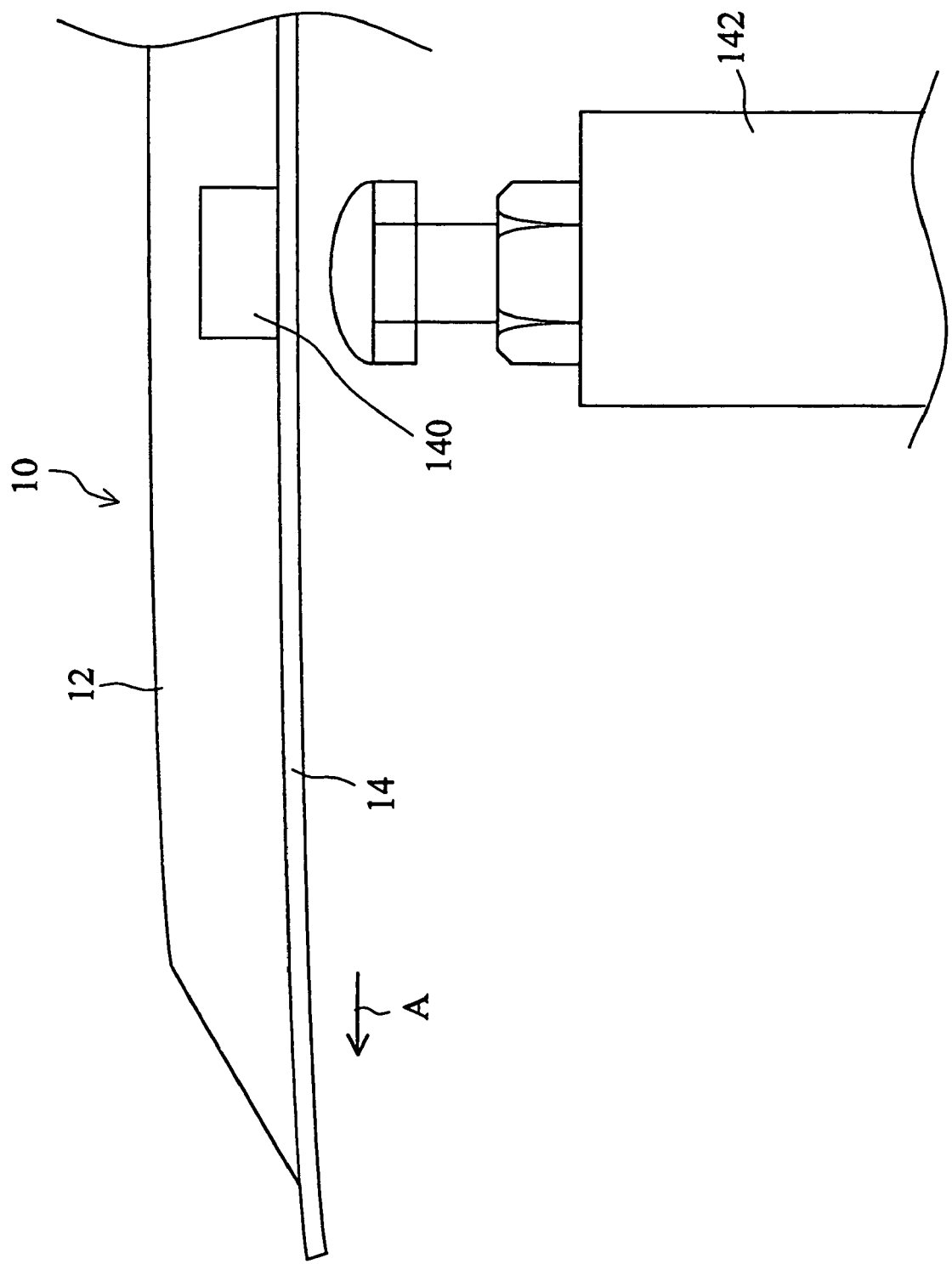
FIG. 11 is a side view of a flange pushed down by an upper clamp at the upper face.

FIG. 10(a) is a perspective view of an auxiliary cooling jacket for cooling the flange from the lower side, FIG. 10(b) is a front view of the jacket of FIG. 10(a), and FIG. 10(c) is a front view of a work of another shape and an auxiliary cooling jacket for this work. FIG. 11 is a side view of a flange pushed down at the upper face by the upper clamp.

FIG. 12(a) is a side view of a flange pushed down at the tip portion by the upper clamp, and FIG. 12(b) is a front view of the flange of FIG. 12(a). In these drawings, the same symbols as in FIGS. 6 and 7 are used for indicating the corresponding elements.

As shown in FIGS. 10(a)–10(b), an auxiliary cooling jacket 130 is provided below the flange 14 to eject a liquid coolant onto the lower face of the flange 14. The heating of the shoulder portion 16 causes rise of the temperature of the flange 14. However, ejection of a liquid coolant from the auxiliary cooling jacket 130 during heating of the shoulder portion 16 cools the flange 16 to prevent temperature rise of the flange 16. Thus, deformation of the flange 14 caused by the temperature rise of the flange 14 can be prevented. Such an auxiliary cooling jacket 130 may be incorporated in the hardening apparatus 20.

In FIGS. 10(a)–10(b), the liquid coolant is ejected to the lower face of the flange 14. On the other hand, for the work 10 having a shape as shown in FIG. 10(c), the cooling jacket 134 may be provided to eject the liquid coolant to the side face 132.

As shown in FIG. 11, a clamp 140 for pushing down the upper face of the flange 14 may be incorporated into the hardening apparatus. In this case, a stopper 142 is placed below the clamp 140 to prevent the flange 14 from the displacement larger than a prescribed extent. Thereby, the flange 14 coming to be displaced lower is brought into contact with the stopper 142, and the displacement is stopped by 142. Thus the deformation of the flange 14 is prevented.

Figure 12:
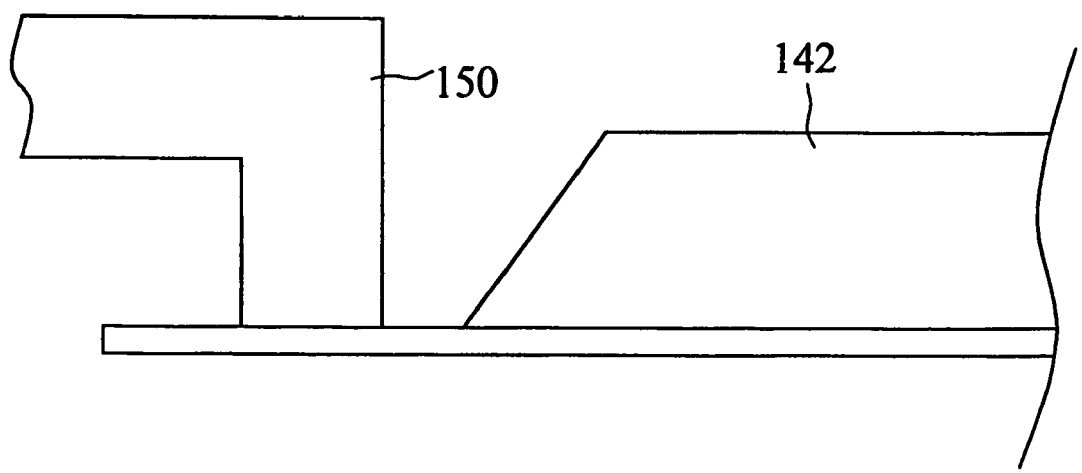
FIG. 12(a) is a side view of a flange pushed down by an upper clamp at the tip portion.
FIG. 12(b) is a front view of the flange of FIG. 12(a).
Figure 12:
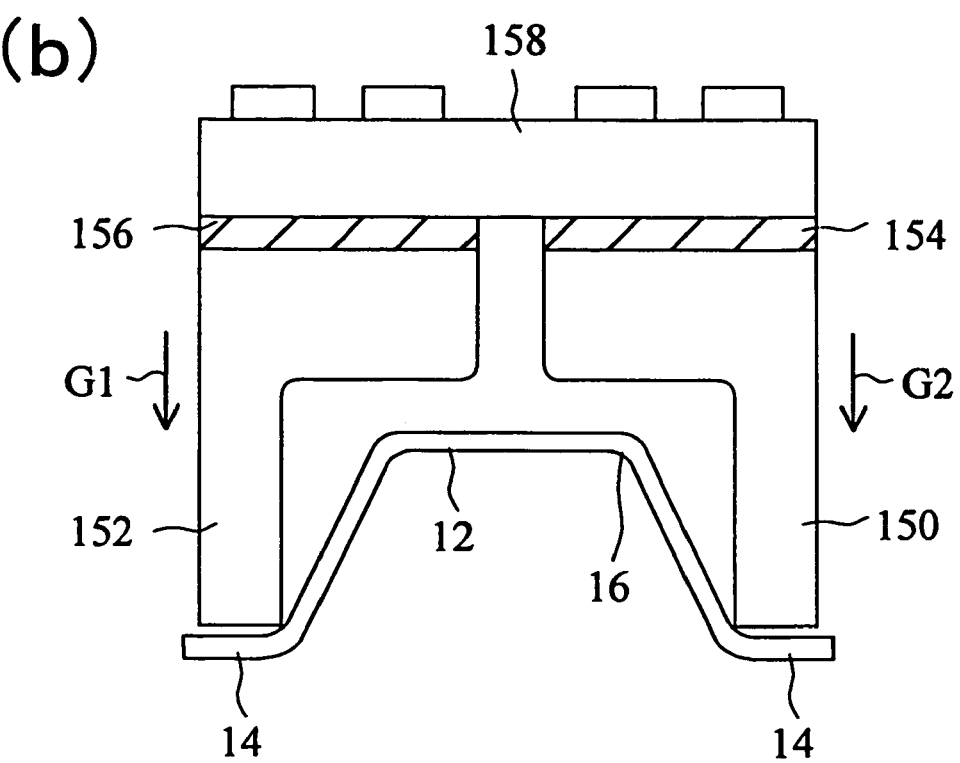

As shown in FIG. 12, upper clamps 150,152 may be incorporated into the hardening apparatus 20 to push the tip portion of the flange 14 downward. On the upper faces of the upper clamps 150,152, spacers 154,156 are respectively placed, and the clamps 150,152 are pressed by one pressing plate 158. In this case, the thickness of the spacers 154,156 may be suitably changed to change the pressing force G1, G2 to change the force of pressing the flange 14. Thereby the distortion of the work 10 can be prevented.

A method is explained below for hardening of the shoulder portion 16 of the work 10 by use of the aforementioned hardening apparatus 20.

Prior to the hardening of the shoulder portion 16 of the work 10 by use of the aforementioned hardening apparatus 20, the shoulder portion 16 was hardened without applying any external force to the work 10 (in a free state) without employing the hardening apparatus 20. After this hardening, the extent and direction of the deformation were measured at plural positions of the flange 14. The results are explained by reference to FIG. 13.

Figure 13:
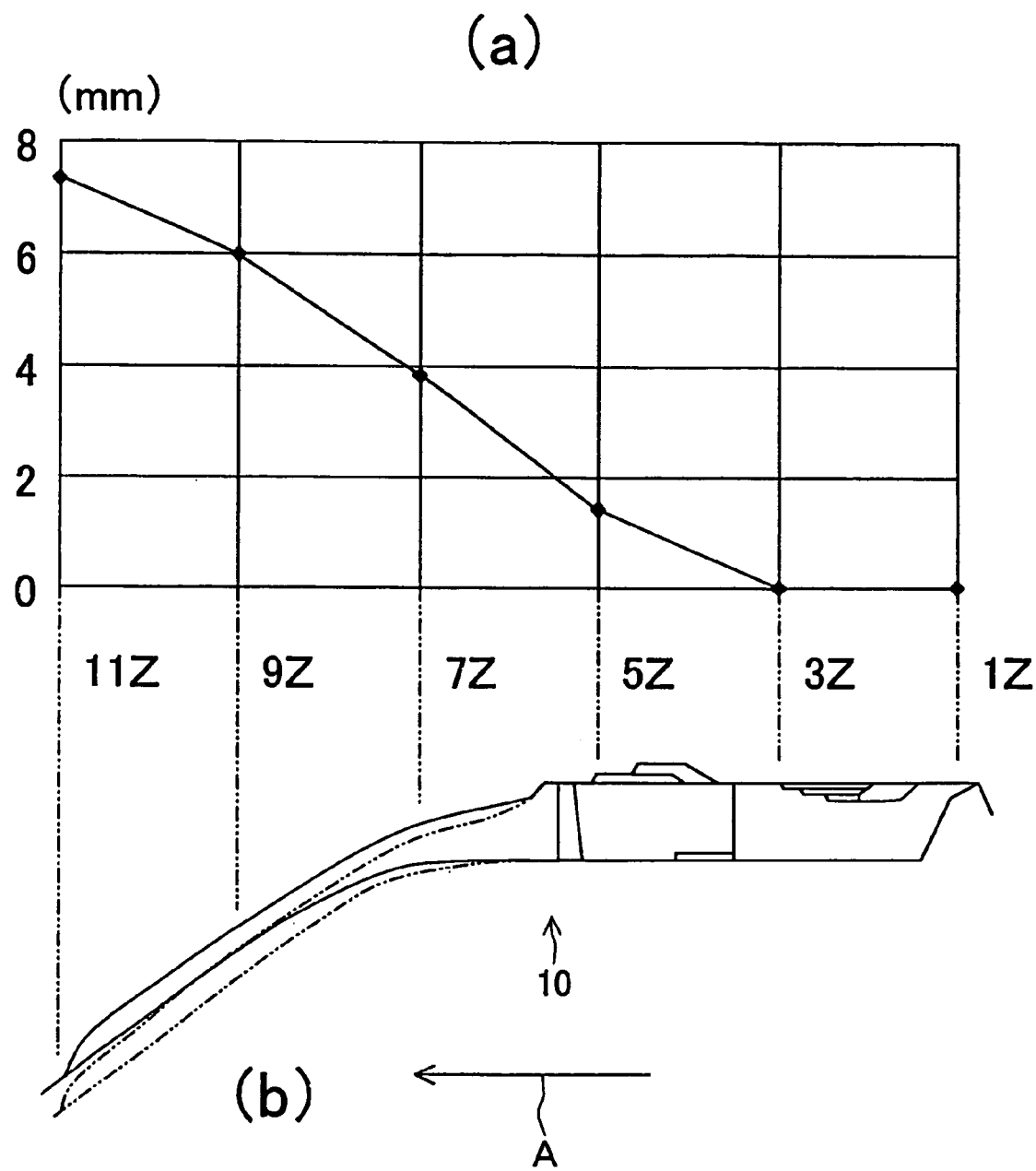
FIG. 13(a) is a graph showing deformation at the aforementioned plural positions.
FIG. 13(b) is a side view of the work 10, showing the positions of the deformation corresponding to FIG. 13(a).

FIG. 13(a) is a graph showing extent of deformation at the aforementioned plural positions, and FIG. 13(b) is a side view of the work 10, showing the positions corresponding to FIG. 13(a). The abscissa in FIG. 13(a) corresponds to the length direction of the work 10, and the ordinate shows the amount of the deformation. The symbols 1Z to 11Z indicate the positions of measurement of the deformation. In FIG. 13, the same symbols as in FIG. 6 are used to indicate the corresponding elements. In FIG. 13, the two-dot chain line denotes the shape before the hardening.

In the hardening in the free state as described above, deformation is liable to occur in the upstream region in the arrow-A direction of the work 10 (positions 11Z and 9Z, narrower portions). For example, the work became warped upward by about 7 mm at the position 11Z, and about 6 mm at the position 9Z. Such upward warpage was less in the downstream portions along the arrow-A direction in the work 10.

Then, the shoulder portion 16 of the work 10 was hardened by the hardening apparatus 20 in consideration of the amount and direction of the deformation. In this hardening, the flange 14 was brought into contact with the aforementioned contacting column 40 at the portion of 11Z (contact portion). The portion of 11Z is brought into contact with the contacting column 40 with a spacer 44 inserted between the portion 11Z and the contacting column 40. Thereby, the portion of the flange 14 (above-mentioned contact portion) where the spacer 44 was inserted was elastically deformed in the direction reverse to the aforementioned deformation direction. In this experiment, the hardening was conducted for the elastic deformation of 3 mm (first case) and that of 5 mm (second case). Further, the hardening was conducted by use of an apparatus 20 equipped with the aforementioned moving device 100, the auxiliary cooling jacket 130, the clamp 140, and the stopper 142 (hereinafter simply referred to as an apparatus) (third case). In the third case, the elastic deformation was adjusted to 5 mm.

The experiments of the first, second, and third cases are explained by reference to FIG. 14.

FIG. 14(a) is a graph showing the deformation after the experiment at the above-mentioned positions 1Z–11Z, and FIG. 14(b) is a side view of the work 10, showing the deformed positions corresponding to FIG. 14(a).

Figure 14:
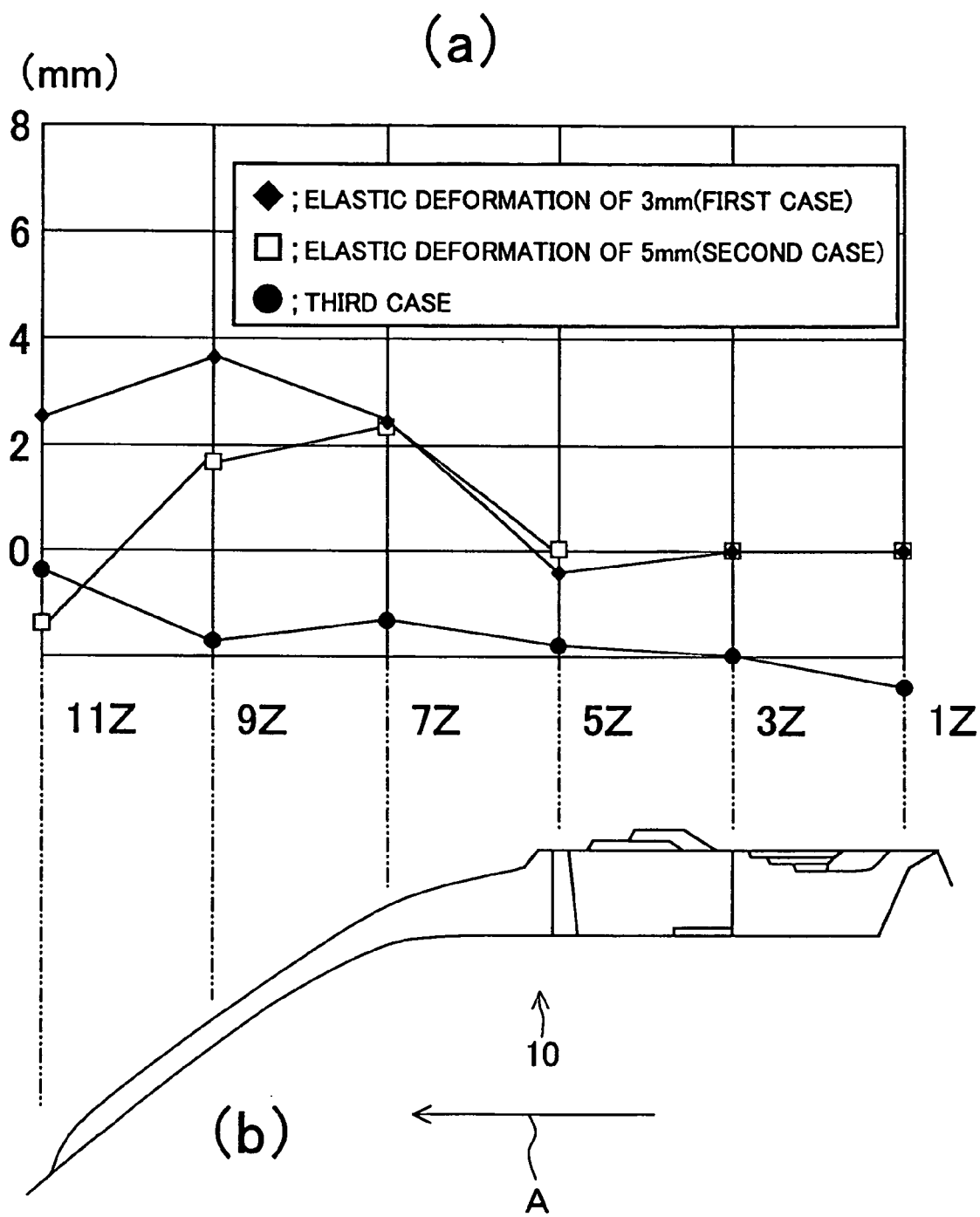
FIG. 14(a) is a graph showing deformation after the experiment at the above-mentioned positions 1Z–11Z.
FIG. 14(b) is a side view of the work 10, showing the deformed positions corresponding to FIG. 14(a).

FIG. 14(a) is a graph showing extent of deformation at the aforementioned positions of 1Z to 11Z, and FIG. 14(b) is a side view of the work 10, showing the positions corresponding to FIG. 14(a). The abscissa in FIG. 14(a) corresponds to the length direction of the work 10, and the ordinate shows the amount of the deformation. The positions 1Z to 11Z indicate the positions of the measurement of the deformation. In FIG. 14, the same symbols as in FIG. 6 are used to indicate the corresponding elements.

The experiment was conducted with the hardening apparatus 20 as described above. Therefore, in the state before the hardening, the flange 14 is supported by the supporting columns 42 at plural positions except the aforementioned contact portion. During the hardening process, at and around the plural supported positions, the deformation by upward movement (displacement) by heating is stopped by contact with the stopper 45 as shown in FIG. 8(a). Thereby, the deformation of the flange 14 is suppressed.

As mentioned above, the lower ends of the supporting columns 42 are not fixed to the pedestal 30, and are movable along a guide rail or the like (not shown in the drawing) in the length direction (arrow-A direction) and the breadth direction (perpendicularly to the face of the drawing) of the work 10. Therefore, the supporting columns 42 are movable with the movement (displacement) of the flange 14 caused by heating-cooling for the local hardening of the work 10. Thus, the supporting columns 42 do not fix the flange 14, and the break of the flange 14 caused by the fixation is prevented.

In heating the shoulder portion 16 up to the hardening temperature, an electroconductive member 56 is brought near to the shoulder portion 16, and an AC current is allowed to flow through the electroconductive member 56 at a frequency which causes attraction between the current flowing though the electroconductive member 56 and the current flowing through the shoulder 16. The shoulder portion 16 is heated up to the hardening temperature by the electric current. Even when the shoulder portion 16 has a complicated shape, the shoulder portion 16 can readily be heated by placing the electroconductive member 56 having a corresponding shape near the shoulder portion 16.

The electrodes 52,54 in contact with the shoulder portion 16 are movable in correspondence with the movement (displacement) of the shoulder portion 16 caused by heating-cooling. Therefore, the electrodes 52,54 do not restrain the ends of the shoulder portion 16 in the length direction, not causing deformation nor break by restraint.

In heating of the shoulder portion 16, the clearance between the electroconductive member 56 and the shoulder portion 16 is kept constant by the bolts 58 and balls 60, deformation of the shoulder portion to suppress approach or departure of the shoulder portion to or from the electroconductive member 56, which enables entirely uniform heating of the shoulder portion 16 to the hardening temperature. This prevents the deformation or break of the shoulder portion 16 caused by nonuniform temperature distribution in the shoulder portion 16.

After heating to the hardening temperature, the shoulder portion 16 is quenched by ejecting a liquid coolant from ejection holes 72. The ejection holes are nearly uniform distances from the back face of the work 10 to cool uniformly the shoulder portion 16. Thereby deformation or break owing to the nonuniform cooling is prevented.

As described above, various measures are taken in the heat-treating apparatus 20 to suppress the deformation and to prevent break of the flange 14. As the results, the flange 14 is not broken, and deforms less as shown in FIG. 14.

In the experiment employing the apparatus of the third case, the deformation was very small. Naturally no breaking of the work 10 was occurred.

INDUSTRIAL APPLICABILITY

As described above, in the production of a flanged article of the present invention, an external force is applied only to a prescribed first portion of the flange. The external force to be applied can be controlled not to cause breaking at or near the first portion. Therefore, the flange is not broken. Further, the first portion of the flange can be deformed elastically by applying an external force in the prescribed direction (direction reverse to the deformation direction of the first portion of the flange) to the first portion. With the first portion deformed in the aforementioned prescribed direction, the second portion only is hardened. Then the external force is removed. Thereby, the deformation of the flange which can be caused by the internal stress resulting from press-forming and by the stress resulting from the local hardening of the second portion (stress formed by expansion-contraction and martensitic transformation owing to heating-cooling) is retarded or inhibited by application of external force to the flange in the reverse direction to the deformation direction during the hardening process. Consequently, the deformation of the flanged article including the flange is entirely prevented, and the flanged article can be produced without breaking.

In applying the external force to the aforementioned first portion, a predetermined contact member may be brought downward into contact with the upper face of the first portion, or upward into contact with the lower face of the first portion, and a spacer corresponding to the external force in the predetermined direction may be inserted between the contacting face of the article and the contact member. By application of the external force to the first portion in such a manner, the strength of the external force can readily be adjusted by changing the thickness of the spacer, whereby the breaking can be surely prevented.

In determining preliminarily the aforementioned first portion and prescribed direction, a flanged article formed from a prescribed source material by press-forming is hardened only at the second portion without applying an external force; after the hardening, the deformation degree and deformation direction are measured at several positions of the flange; the portion where the deformation exceeds a prescribed extent is taken as the first portion; and the direction reverse to the above deformation direction is taken as the prescribed direction. The deformation of the flange can be more surely prevented by applying an external force at the positions of large deformation in the direction reverse to the deformation direction.

In deforming elastically the aforementioned predetermined portion of the flange, the portion of the flange other than the first portion may be supported upward by a supporting member to keep the original shape before the hardening of the flanged article to prevent the deformation of the flange more surely and to prevent the break of the flange more surely.

In supporting the portion other than the first portion of the flange from the lower side by supporting members, the supporting members may be set to be movable to follow the movement of the portion other than the first portion. Thereby, the supporting member can move to follow the movement of the portion during the hardening to prevent action of a compulsive force on the portion, thus preventing break of that portion.

Further, in supporting the portion other than the first portion of the flange from the lower side by supporting members, a stopper may be provided above the supported position with a predetermined clearance to stop upward deformation of the portion of the flange other than the first portion. Thereby, upward deformation of the portion other than the first portion can be prevented to suppress more surely the deformation of the flange.

In hardening the aforementioned second portion, electrodes may respectively be brought into contact with the second portion at or near one end and at or near the opposite end of the second portion, and an elecroconductive member for flowing electric current through the second portion may be placed close to the second portion, and an AC current may be applied which has a frequency to cause attraction between the current flowing through the electroconductive member and the current flowing through the second portion to heat the second portion to the hardening temperature. Thereby, the second portion, even if it is in a complicated shape, can readily be heated by placing the electroconductive member in a shape corresponding to the second portion close to the second portion.

For contact of the electrodes with the second portion at or near one end and at or near the opposite end thereof, the electrodes may be set so as to be movable to follow the movement of the one and opposite ends. Thereby, even if the second portion moves (or displaces) owing to the expansion-construction, the electrodes also move (displace), preventing the action of a compulsive force to the flange and preventing the break of the flanged article more surely.

For bringing the electroconductive member close to the second portion, the electroconductive member and the second portion may be brought into contact together with interposition of an insulating member to keep the clearance between the electroconductive member and the second portion. Thereby the clearance between the electroconductive member and the second portion is kept invariable even when the second portion is deformed by heating and tends to come close to the electroconductive member or to depart from the electroconductive member, enabling uniform heating of the entire of the second portion at a hardening temperature.

In quenching the second portion having been heated to the hardening temperature, a liquid coolant may be ejected onto the face of the second portion reverse to the electrode-contacting face through ejection outlets placed at uniform distances from the reverse face. This enables uniform cooling of the second portion by uniform collision of liquid coolant against the second portion on the reverse face to prevent more surely the deformation and break of the flanged article.

Thus in forming a flanged article by press-forming of a prescribed source material, the flanged article, which extends in a prescribing direction and has a cross-section in a shape of a hat having a brim, can be produced with effective suppression of hardening deformation and without break.

In particular, in forming a flanged article as a center pillar reinforce of a car by press-forming of a prescribed source material, the center pillar reinforce can be produced with effective suppression of hardening deformation and without break.

With the heat-treating apparatus for a flanged article of the present invention, the first portion of the flange can be elastically deformed in the reversed direction of the possible hardening deformation of the first portion by inserting a spacer of a predetermined thickness. The extent of the elastic deformation can be adjusted not to cause break at or near the first portion. With the first portion deformed elastically in the aforementioned reverse direction, the second portion other than the first portion is hardened, and thereafter the spacer is removed. In such a manner, even if stress caused by the internal stress of the flanged article and the stress caused by hardening of the second portion (stress caused by expansion-constriction, martensitic transformation, etc. owing to heating-cooling) tend to deform the flange, the flange is less liable to be deformed and the deformation is prevented since an external force is applied during the hardening in the direction reverse to the direction of the deformation, Consequently, deformation of the entire flanged article including the flange can be heat-treated without deformation entirely and without break.

The supporting member may be movable with movement of the portion other than the first portion of the flange. With such supporting members, the supporting members move to follow the movement of the aforementioned portion during the hardening not to cause compulsive stress, not causing break of the aforementioned portion.

The heat-treating apparatus may be provided with electrodes in contact with the one end of the second portion other than the flange and the other end thereof respectively, and an electroconductive member for applying an electric current through the second portion. With such an apparatus, the electrodes are brought into contact with the one end and the other end mentioned above, and the electroconductive member is brought near to the second portion, and an AC current having a frequency to cause attraction between the current flowing the electroconductive member and the current flowing the second portion to heat the second portion to the hardening temperature. Accordingly, the second portion, even if it is in a complicated shape, can readily be heated simply by bringing the electroconductive member in a shape corresponding to the second portion close together with the second portion.

The heat-treatment apparatus may be provided with a clearance-retaining member fixed to the electroconductive member to keep the clearance between the electroconductive member and the second portion. Thereby, the clearance between the electroconductive member and the second portion is kept constant by the clearance-retaining member even when the second portion is deformed by heating and tends to come close to the electroconductive member or to depart from the electroconductive member, enabling heating of the entire of the second portion uniformly at a hardening temperature.

The heat-treating apparatus may be provided with a cooling jacket placed with a nearly uniform spacing from the face of the second portion reverse to the electrode-contacting face and having ejection outlets for ejecting a liquid coolant. With this cooling jacket, the liquid coolant is allowed to collide uniformly against the abovementioned reverse face to cool the second portion uniformly, preventing more surely the deformation of the flanged article and break thereof.

In the heat-treating method for a flanged article of the present invention, an external force is applied only to the predetermined first portion. The external force is adjustable not to cause break in or near the first portion. Therefore, the flange will not be broken. Further the external force is applied to the first portion to cause elastic deformation in a predetermined direction which is reverse to the direction of possible deformation of the first portion. The second portion only is hardened with the first portion kept in an elastically deformed state. Thereby, even if stress caused by the internal stress of the flanged article and the stress caused by hardening of the second portion (stress caused by expansion-constriction, martensitic transformation, etc. owing to heating-cooling) tend to deform the flange, the flange is less liable to be deformed, and the deformation is prevented since an external force is being applied in the direction reverse to the direction of the possible deformation, Consequently, a flanged article can be produced without deformation entirely and break.

In applying the external force to the aforementioned first portion, a predetermined contact member may be brought downward into contact with the upper face of the first portion, or upward into contact with the lower face of the first portion, and a spacer corresponding to the external force in the predetermined direction may be inserted between the contacting face of the article and the contact member. By application of the external force to the first portion in such a manner, the strength of the external force can readily be adjusted by changing the thickness of the spacer.

In determining preliminarily the aforementioned first portion and prescribed direction, the aforementioned flanged article is hardened only at the second portion without applying an external force; and after the hardening, the deformation extent and deformation direction are measured at several positions of the flange; the position where the deformation exceeds a prescribed extent is taken as the first portion; and the direction reverse to the above deformation direction is taken as the prescribed direction. The deformation of the flange can be more surely prevented by applying an external force at the positions of large deformation in the direction reverse to the deformation direction.

In deforming elastically the aforementioned predetermined portion, the portion of the flange other than the first portion may be supported upward by supporting members to keep the original shape before the hardening of the flanged article to prevent the deformation of the flange more surely and to prevent the break of the flange more surely.

In supporting the portion other than the first portion of the flange from the lower side by supporting members, the supporting members may be set to be movable to follow the movement of the portion other than the first portion. Thereby, the supporting member can move to follow the movement of the portions during the hardening to prevent action of a compulsive force on the portion, thus preventing break of that portion.

Further, in supporting the portion other than the first portion of the flange from the lower side by supporting members, a stopper may be provided above the supported position with a predetermined clearance to stop upward deformation of the portion of the flange other than the first portion. Thereby, upward deformation of the portion other than the first portion can be prevented to suppress more surely the deformation of the flange.

In hardening the aforementioned second portion, electrodes may respectively be brought into contact with the second portion at or near one end and at or near the opposite end of the second portion, and an elecroconductive member for flowing electric current through the second portion may be placed close to the second portion, and an AC current may be applied which has a frequency to cause attraction between the current flowing through the electroconductive member and the current flowing through the second portion to heat the second portion to the hardening temperature. Thereby, the second portion, even if it is in a complicated shape, can readily be heated by placing the electroconductive member in a shape corresponding to the second portion close to the second portion.

For contact of the electrodes with the second portion at or near one end and at or near the opposite end thereof, the electrodes may be set so as to be movable with the one and opposite ends to follow the movement of the one and opposite ends. Thereby, even if the second portion moves (or displaces) owing to the expansion-construction, the electrodes also move (displace), preventing the action of a compulsive force to the flange and preventing the deformation of the flanged article more surely.

For bringing the electroconductive member close to the second portion, the electroconductive member and the second portion may be brought into contact together with interposition of an insulating member to keep the clearance between the electroconductive member and the second portion. Thereby the clearance between the electroconductive member and the second portion is kept invariable even when the second portion is deformed by heating and tends to come close to the electroconductive member or to depart from the electroconductive member, enabling uniform heating of the entire of the second portion at a hardening temperature.

In quenching the second portion having been heated to the hardening temperature, a liquid coolant may be ejected onto the face of the second portion reverse to the electrode-contacting face through ejection outlets placed at uniform distances from the reverse face. This enables uniform cooling of the second portion by uniform collision of liquid coolant against the second portion on the reverse face to prevent more surely the deformation and break of the flanged article.

The invention claimed is:

1. A method for producing a flanged article having a flange stretching out of periphery, comprising steps of:
   forming the flanged article by press-forming a prescribed source material,
   deforming elastically only a first portion of the flange of the flanged article by application of an external force in a direction,
   hardening a second portion of the flanged article other than the flange with the first portion being kept deformed elastically, and
   releasing the external force after the hardening step operation to produce the flanged article,
   wherein the external force is applied to the first portion by bringing a contact member downward into contact with an upper face of the first portion, or upward with a lower face of the first portion, and
   inserting a spacer between said upper face or said lower face that is in contact with the contact member and a contact member corresponding to the external force in the direction to apply the external force to the first portion.

2. The method for producing a flanged article according to claim 1, wherein the first portion and the direction are decided preliminarily by
   hardening the flanged article formed by press-forming of a prescribed source material locally at the second portion thereof without application of an external force,
   measuring, after the hardening step, extents and directions of resulting deformation at plural positions of the flange,
   deciding, as the first portion, the portion where the deformation exceeds a predetermined extent, and deciding, as the direction, a direction reverse to the deformation direction.

3. The method for producing a flanged article according to claim 1, or 2, wherein, in deforming elastically the first portion of the flange, a portion of the flange other than the first portion is supported upward by a supporting member to keep the original shape before the hardening of the flanged article.

4. The method for producing a flanged article according to claim 3, wherein the portion of the flange other than the first portion is supported from a lower side by supporting members to have the supporting members to be movable to follow the movement of the portion other than the first portion.

5. The method for producing a flanged article according to claim 3, wherein the portion of the flange other than the first portion is supported from a lower side, and a stopper is provided above a supporting position with a predetermined clearance to stop upward movement of the supported portion.

6. The method for producing a flanged article according to any of claims 1 or 2, wherein the second portion is hardened by
   bringing an electrode into contact with the second portion at or near one end and another electrode at or near an opposite end, and bringing an electroconductive member close to the second portion to apply an electric current to the second portion, and
   applying, to the electroconductive member, an AC current having a frequency which causes mutual attraction between a current flowing through the electroconductive member and a current flowing through the second portion to heat the second portion up to the hardening temperature.

7. The method for producing a flanged article according to claim 6, wherein respectively one electrode is brought into contact with the one end and the opposite end
   by bringing into contact the electrodes, said electrodes being movable to follow the movement of the one end and the opposite end or vicinity thereof.

8. The method for producing a flanged article according to claim 6, wherein the electroconductive member is brought close to the second portion by
   bringing the electroconductive member and the second portion into contact with interposition of an insulating member to keep invariable the clearance between the electroconductive member and the second portion.

9. The method for producing a flanged article according to any of claims 1 or 2, wherein the second portion having been heated to the hardening temperature is quenched by
ejecting a liquid coolant onto a face of the second portion reverse to the electrode-contacting face through ejection outlets placed at uniform distances from a reverse face.

10. The method for producing a flanged article according to any of claims 1 to 2, wherein, in forming a flanged article by press-forming of a prescribed source material, the flanged article is formed which extends in a prescribing direction and has a cross-section in a shape of a hat having a brim.

11. The method for producing a flanged article according to any of claims 1 to 2, wherein a center pillar reinforce of a car is formed as the flanged article by press-forming of a prescribed source material.

12. A method for heat-treating a flanged article having a flange stretching out of the periphery, comprising steps of
deforming elastically only a first portion of the flange of the flanged article by application of an external force in a direction, and
hardening a second portion of the flanged article other than the flange with the first portion being kept deformed elastically,
wherein the external force is applied to the first portion by
bringing a contact member downward into contact with an upper face of the first portion, or upward with a lower face of the first portion, and
inserting a spacer between said upper face or said lower face that is in contact with the contact member and a contact member corresponding to the first external force in the direction to apply the external force to the first portion.

13. The method for heat-treating a flanged article according to claim 12, wherein the first portion and the direction are decided preliminarily by
hardening the flanged article locally at the second portion without application of an external force,
measuring, after the hardening step, extents and directions of resulting deformation at plural positions of the flange,
deciding, as the first portion, the portion where the deformation exceeds an extent, and deciding, as the direction, a direction reverse to at least one of the deformation directions.

14. The method for heat-treating a flanged article according to claim 12, or 13, wherein, in deforming elastically the first portion of the flange, a portion of the flange other than the first portion is supported upward by a supporting member to keep an original shape before the hardening of the flanged article.

15. The method for heat-treating a flanged article according to claim 14, wherein the portion of the flange other than the first portion is supported from a lower side by plural supporting members wherein the supporting members are adapted to be movable to follow the movement of the portion other than the first portion.

16. The method for heat-treating a flanged article according to claim 14, wherein the portion of the flange other than the first portion is supported from a lower side and a stopper is provided above a supporting position with a predetermined clearance to stop upward movement of the supported portion.

17. The method for producing a flanged article according to any of claims 12 or 13, wherein the second portion is hardened by
bringing an electrode into contact with the second portion at or near a first end and another electrode at or near an opposite end, and bringing an electroconductive member close to the second portion to apply an electric current to the second portion, and
applying, to the electroconductive member, an AC current having a frequency which causes mutual attraction between a current flowing through the electroconductive member and a current flowing through the second portion to heat the second portion up to a hardening temperature.

18. The method for heat-treating a flanged article according to claim 17, wherein respectively one of said electrodes is movable and is brought into contact with the one end and the opposite end by bringing into contact the movable electrodes to follow the movement of the one end and the other end or vicinity thereof.

19. The method for heat-treating a flanged article according to claim 17, wherein the electroconductive member is brought close to the second portion by
bringing the electroconductive member and the second portion into contact with interposition of an insulating member to keep invariable the clearance between the electroconductive member and the second portion.

20. The method for heat-treating a flanged article according to any of claims 12 or 13, wherein the second portion having been heated to a hardening temperature is quenched by
ejecting a liquid coolant onto a face of the second portion reverse to an electrode-contacting face through ejection outlets placed at uniform distances from a reverse face.

* * * * *